Dec. 18, 1928.  
C. M. ADAMS  
1,695,264  
ELECTRICAL INDICATING INSTRUMENT
Filed Oct. 13, 1926
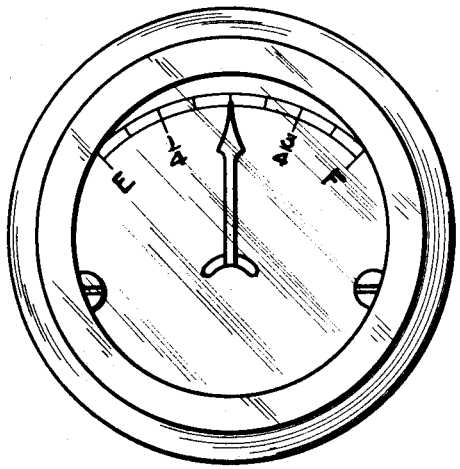
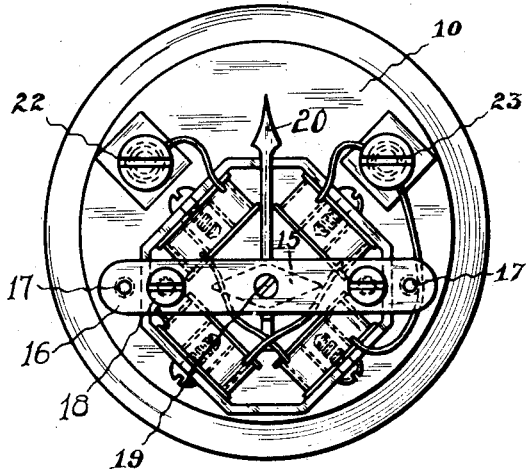
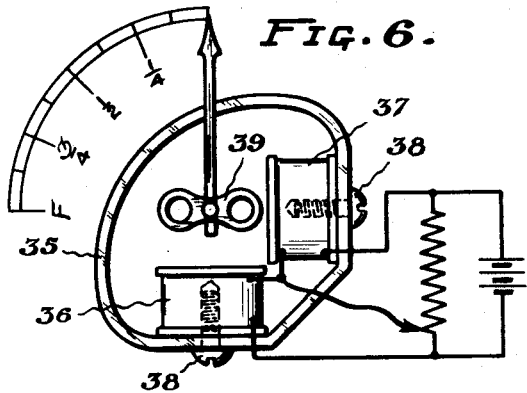
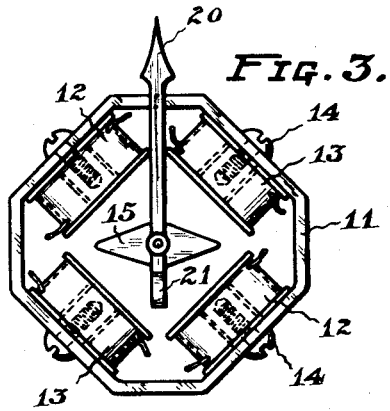
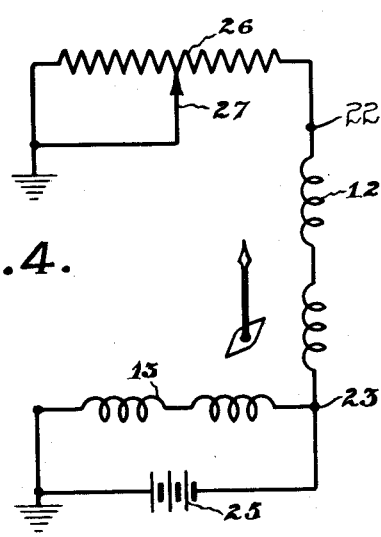
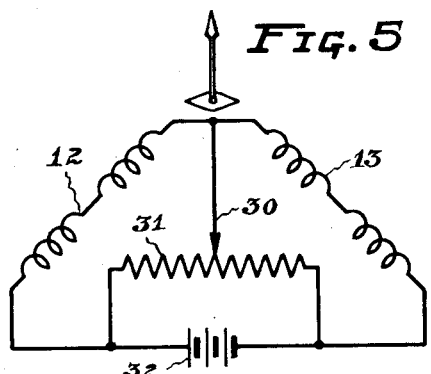
INVENTOR  
Clark M. Adams.  
BY  
ATTORNEYS Patented Dec. 18, 1928.

1,695,264

UNITED STATES PATENT OFFICE.

CLARK M. ADAMS, OF OTTAWA HILLS, OHIO, ASSIGNOR TO THE W. G. NAGEL ELECTRIC COMPANY, OF TOLEDO, OHIO, A CORPORATION OF OHIO.

ELECTRICAL INDICATING INSTRUMENT.

Application filed October 13, 1926. Serial No. 141,337.

This invention relates to an electrical indicating instrument and particularly to instruments adapted to indicate changes in the ratio of current flowing through two circuits controlled from a remote station.

The invention also contemplates an improved control circuit for use with instruments of this general character.

An object of the invention is to produce an indicating instrument of the above designated character that is of improved construction, that is sturdy, inexpensive to manufacture, and that will be substantially independent of external magnetic influences and variations in the voltage of the source.

Another object of the invention is to provide an instrument in which the indications are substantially free from the influences of residual magnetism retained in the magnetizable parts of the instrument.

A third object of the invention is in general to provide a new and improved type of instrument that is particularly suitable for use in connection with remotely controlled liquid level indicators.

Figure 1 of the accompanying drawing is a face view of an assembled instrument of the character herein proposed that is particularly adapted to indicate the level of fuel in the tank of an automotive vehicle, the instrument being mounted on the dashboard and controlled from a rheostat or other circuit varying device that is mounted in the fuel tank of the car.

Fig. 2 is a top plan view of the instrument shown in Fig. 1 with the cover plate removed.

Fig. 3 is an enlarged detail view of the magnetizable parts of the instrument showing their magnetic relationship.

Fig. 4 is a diagrammatic view of the electrical and part of the magnetic circuit of an instrument constructed in accordance with my invention.

Fig. 5 is a corresponding view of a modified electrical circuit for use with an instrument of the character herein proposed; and Fig. 6 is a top plan view of the cooperating electromagnetic elements of the instrument diagrammatically showing the circuit relation for the electrical control circuit of the instrument.

The instrument shown in Fig. 1, Fig. 2, and Fig. 3 comprises a base 10 that carries a closed magnetic field piece 11, preferably of soft iron having relatively high permeability and low magnetic retentiveness. The ring 11 is preferably of substantially the same magnetic cross-section as the pairs of electromagnetic coils 12 and 13 that are arranged to diametrically oppose each other. All of the coils 12 and 13 are of conventional form of so-called "spool winding" that are held in place within the magnetic ring 11 by suitable screws 14.

A magnetic armature 15 is pivotally supported between the base 10 and a cross bar 16 of conventional form used in instrument manufacture. The cross arm 16 is of nonmagnetic material and is supported from a pair of posts 17 formed on the base. The cross bar is secured in place by suitable screws 18. An adjustable bearing screw 19, that has a pivot socket formed in its inner end, is carried by the bar 16 and is adapted to receive and support one end of the pivot staff of the armature 15. An indicator vane 20 is carried by the shaft of the armature 15 and is adapted to be moved in accordance with movement of the armature. A counter balancing tail piece 21, that is preferably a continuation of the indicator vane 20, serves as one means for obtaining the proper counterbalance of the moving parts.

Coils 12 are connected in series as indicated in Fig. 2 and Fig. 4 and one terminal of one coil is connected to a binding post 22 and one terminal of the other coil is connected to the binding post 23. Coils 13 are also connected in series relation and one terminal of one of the coils is grounded on the bar 16 whereas one terminal of the other coil is connected to the binding post 23. The instrument base is adapted to be grounded on the frame of the vehicle. Fig. 4 shows the electrical connections for the instrument. The binding post 23 as diagrammatically shown is connected to one side of a storage battery 25 whereas the binding post 22 is connected to one terminal of a resistance winding 26 that has its other end grounded and that has a contact member 27 that is caused to traverse the resistance winding in accordance with changes in the level of the liquid being measured.

The armature of the instrument takes the general direction of the resultant magnetic flux set up by windings 12 and 13. The flux components of these windings are arranged substantially at right angles to each other. The variation in the relative magnitude of the flux components causes the resultant flux to change in direction. This causes the armature to swing to a multiplicity of indicating positions in accordance with changes in the direction of the resultant field.

The closed ring 11, of magnetic material, tends to equalize the magnetic potential for the different parts of the ring. When the electrical circuits are deenergized, the residual will be equalized by the ring and therefore its influence on the instrument indication will be minimized. The closed ring also prevents stray magnetic fields from influencing the indications of the instrument. This is very important when the instrument is used on an automotive vehicle near a magnetic speedometer.

Another circuit that has many desirable characteristics when applied to this particular instrument is shown in Fig. 5 wherein the windings are diagrammatically shown and numbered in accordance with numbers used in Fig. 2. In this system of control the energization of the series connected windings 12 and 13 is differentially controlled by movement of the contact member 30 along a resistance unit 31 that is connected in shunt with a storage battery 32.

With the electrical circuit shown in Fig. 5, the magnetization of coils 12 is increased whereas the magnetization of coils 13 is decreased through movement of the contact member 30 from the right hand to the left hand of the rheostat 31. The total magnetizing influence of coils 12 and 13 is, however, substantially constant. The magnetic ring 11 will, therefore, be energized to substantially the same magnetic potential throughout its extent for duplicate positions of the contact member 30, regardless of the direction from which the contact member approaches the position. Since in the illustrated embodiment of the invention all electromagnetic parts of the instrument, with the exception of the pivotally mounted indicator vane, are magnetically connected to the closed ring 11, there will be a minimum difference of magnetic potential in the different parts of the ring due to residual magnetism in the instrument. This minimizes the influence of residual magnetism on the instrument indications.

If the instrument is controlled from the system shown in Fig. 4, the amplitude of movement of the indicator vane is greatly reduced as compared with the amplitude of movement when both coils are inversely varied in excitation. The advantage of this circuit is the grounding of one end of the rheostat 26 and of the contact element 27. This reduces the cost of manufacture of the rheostat and eliminates all fire hazard when the instrument is used in connection with inflammable fuels such as gasoline and the like.

Fig. 6 shows a modified form of instrument that employs two coils instead of the four electromagnetic coils used in the instrument shown in Fig. 2 and Fig. 3. This instrument comprises a ring or keeper 35 that is preferably formed of the same magnetizable material as the ring 11 of the instrument shown in Fig. 3 and that carries coils 36 and 37 that are secured thereto by suitable screws 38. The coils 36 and 37 are preferably of inexpensive spool wound type and the magnetic armature 39 that is controlled by the energization of the coils 36 and 37 is mounted in the instrument in substantially the same manner as the previously described mounting for the armature 15. Any other mounting for the armature could be used. The magnetic ring 35 is in this instance preferably about the same width as the ring 11.

It will be obvious that various other modifications could be made in the instrument and that the instrument could be used on many different control systems without departing from the spirit and scope of the invention.

What I claim is:

1. An electrical indicating instrument comprising an endless field piece of relatively soft iron, a magnetizing coil carried by said field piece, a second magnetizing coil similarly carried by said field piece and arranged with its magnetic axis substantially at right angles relative thereto, and an armature of magnetizable material pivotally mounted within said field piece and adapted to be simultaneously influenced by each of said windings and said field piece in accordance with the degree of energization thereof whereby said armature is actuated to a multiplicity of indicating positions.

2. An indicating instrument comprising an endless field piece, a pair of magnetizing coils extending inwardly from the field piece and having their axes arranged at an angle relative to each other, and an armature of magnetizable material pivotally mounted within the field of influence of each of said coils and said field piece whereby said armature is moved to a multiplicity of indicating positions in accordance with the relative energization of said windings.

3. An electrical indicating instrument comprising an endless ring of magnetic material, a pair of magnetizing windings each having a core of magnetic material carried by the inner face of said ring, said magnetizing windings being arranged with their axes substantially at right angles to each other, and an armature of magnetizable material pivotally mounted within the zone of influence of said windings and said field piece whereby said armature is moved to a multiplicity of positions by the combined influence of said windings.

4. An electrical indicating instrument comprising an endless band of magnetizing material, a magnetizing winding having a magnetic core carried by the inner face of said band, a second magnetizing winding having a magnetic core also carried from the inner face of said winding and arranged at an angle relative to the first magnetizing coil, an armature pivotally mounted substantially at the intersection of the axes of said windings and adapted to be magnetically actuated thereby, the side of said band remote from said windings being arranged to approach more closely to the armature than the remaining portions of said band.

In testimony whereof I have hereunto signed my name to this specification.

CLARK M. ADAMS.